United States Patent [19]
Prud'Homme

[11] Patent Number: 5,284,232
[45] Date of Patent: Feb. 8, 1994

[54] CLUTCH WITH STRUCTURAL PLATES, ESPECIALLY OF CARBON-CARBON

[75] Inventor: Guy Prud'Homme, Ste Foy Les Lyon, France

[73] Assignee: Carbone Industrie, Bagnolet Cedex, France

[21] Appl. No.: 956,277

[22] Filed: Oct. 5, 1992

[30] Foreign Application Priority Data

Oct. 9, 1991 [FR] France .................. 9112430

[51] Int. Cl.⁵ .............................................. F16D 13/56
[52] U.S. Cl. ............................. 192/70.21; 192/52; 192/70.14; 192/70.19
[58] Field of Search ................. 192/52, 70.11, 70.14, 192/70.16, 70.19, 70.21, 70.28, 109 A, 109 B

[56] References Cited

U.S. PATENT DOCUMENTS

| | | |
|---|---|---|
| 2,036,005 | 3/1936 | Wemp . |
| 3,189,147 | 6/1965 | Holdeman . |
| 5,127,499 | 7/1992 | Beccaris et al. ......... 192/70.19 XR |

FOREIGN PATENT DOCUMENTS

| | | |
|---|---|---|
| 2460963 | 7/1976 | Fed. Rep. of Germany . |
| 2623862 | 6/1989 | France . |
| 2624571 | 6/1989 | France . |

*Primary Examiner*—Richard M. Lorence
*Attorney, Agent, or Firm*—Sughrue, Mion, Zinn, Macpeak & Seas

[57] ABSTRACT

The present invention concern a clutch with structural friction plates, especially of carbon-carbon, comprised of a drive flywheel, a first driving plate forming a first non-clutching interface with the flywheel, at least one driven plate connected to an output shaft, a driving plate interposed between each pair of driven plates, a second driving plate, a thrust plate forming a second non-clutching interface with the second driving plate, and a casing. A mechanism is operable to apply pressure to the thrust plate and is provided with bars fitted into radial recesses of the driving plates and is fixed to the flywheel. The mechanism includes a "progressive" device interposed in at least one of the non-clutching interfaces which urges the driving plate of the interface towards the adjacent driven plate and against an abutment.

9 Claims, 11 Drawing Sheets

CLUTCH WITH STRUCTURAL PLATES, ESPECIALLY OF CARBON-CARBON

The present invention relates to a clutch with structural friction plates, especially of carbon-carbon, comprising:
- a flywheel,
- a first driving plate forming a first non-clutching interface with the flywheel,
- at least one driven plate connected to an output shaft, a driving plate being interposed between each pair of driven plates,
- a second driving plate,
- a thrust plate forming a second non-clutching interface with the second driving plate,
- a casing comprising a mechanism operable to apply pressure to the thrust plate and provided with bars fitted into radial recesses of the driving plates and fixed to the flywheel.

BACKGROUND OF THE INVENTION

Carbon-carbon friction clutches of this type, used mainly at present in competition vehicles, have many advantages over conventional clutches, in particular very high resistance to large stresses, low wear under high stress and reduced mass and inertia.

However, these clutches are subject to the problem of lack of progressiveness in compressing the plates, which leads to abrupt action, which is particularly badly suited to private vehicles.

Conventional metal plate clutches with non-structural organic linings comprise a cast iron flywheel, at least one driven plate and an operating thrust plate also of cast iron, the friction interfaces being cast iron/organic material. The driven plate is formed by a metal plate provided with a central lining carrier plate and two rings of organic linings. The central plate has axial deformations, for example corrugations, which, by virtue of their resilience, allow the progressive stroke necessary for compression and progressive engagement. A single plate clutch thus comprises such a driven plate with several annular parts attached by riveting or the like.

The object of the invention is to provide a structural plate clutch which, apart from the inherent value of these plates, especially carbon-carbon plates, namely being made in one piece, and their inherent properties which are considerably superior to those of conventional plates, has means referred to as progressive which are reliable and simple, while comprising a limited number of components.

SUMMARY OF THE INVENTION

To achieve this in accordance with the invention, the clutch includes a "progressive" device interposed in at least one of the non-clutching interfaces and urging the driving plate of the interface towards the adjacent driven plate, against abutment means.

This accordingly provides progressive compression of the plates and hence non-abrupt engagement. The progressive stroke is controlled by the location of the abutment means.

In a first embodiment, the progressive device is formed by a corrugated metal ring fitted in a circular groove recessed into the part forming the interface with the driving plate.

This arrangement has the advantage of being particularly resistant to centrifugal force. Thus the ring automatically withstands the stresses caused by this force. Moreover the circular groove in the flywheel and/or in the thrust plate does not weaken them much. Also the progressive device is formed in one piece.

In a second embodiment, the progressive device is formed by at least one resilient, metal, radial tongue disposed against an end face of a bar and whose curved operative end is applied to the driving plate and is fitted in a radial groove recesses into the part forming the interface with the driving plate.

These tongues can be fitted on some or all of the bars of the clutch. The stiffness of the progressive action can thus be controlled by fitting more or less progressive tongues.

The tongue preferably has a part with a hole, disposed between the end of the bar and the part forming the interface with the driving plate, this hole accommodating the means fixing the casing to the flywheel.

As to the abutment means, it is preferably formed by at least one shoulder formed on the bar and against which the edge of the recess of the driving plate abuts.

In one feature of the invention, a device is associated with the progressive device, the packing-up device comprising means for pressing the driving plate of the other non-clutching interface against the adjacent part.

The operation of the clutch is thereby further improved. In the disengaged position, the play is distributed uniformly over the clutching interfaces of the driving and driven plates. The play at one of the non-clutching interfaces, i.e. the progressive stroke is defined by the location of the abutment means. The play at the other non-clutching interface is nil. Compression or engagement occurs in a perfectly uniform manner without interfering action in the region of the flywheel-to-first driving plate interface and the thrust plate-to-second driving plate interface.

The packing-up device preferably comprises at least one resilient metal tongue located between the driving plate of the interface and the next adjacent driving plate, and of which the operative curved end presses the plate of the interface against the adjacent part.

In one modification the packing-up device comprises two tongues located against the side faces of the bar.

In another modification, the bars are U-shaped with an opening on the side of the interface part, the driving plate having two recesses receiving the limbs of the bar and the tongue being located in the opening and pressing against the driving plate between the recesses.

In order to simplify assembly, the progressive device and the packing-up device may be in one piece.

BRIEF DESCRIPTION OF THE DRAWINGS

Embodiments of the invention are described by way of example with reference to the accompanying drawings, in which.

DETAILED DESCRIPTION

Figure 1:
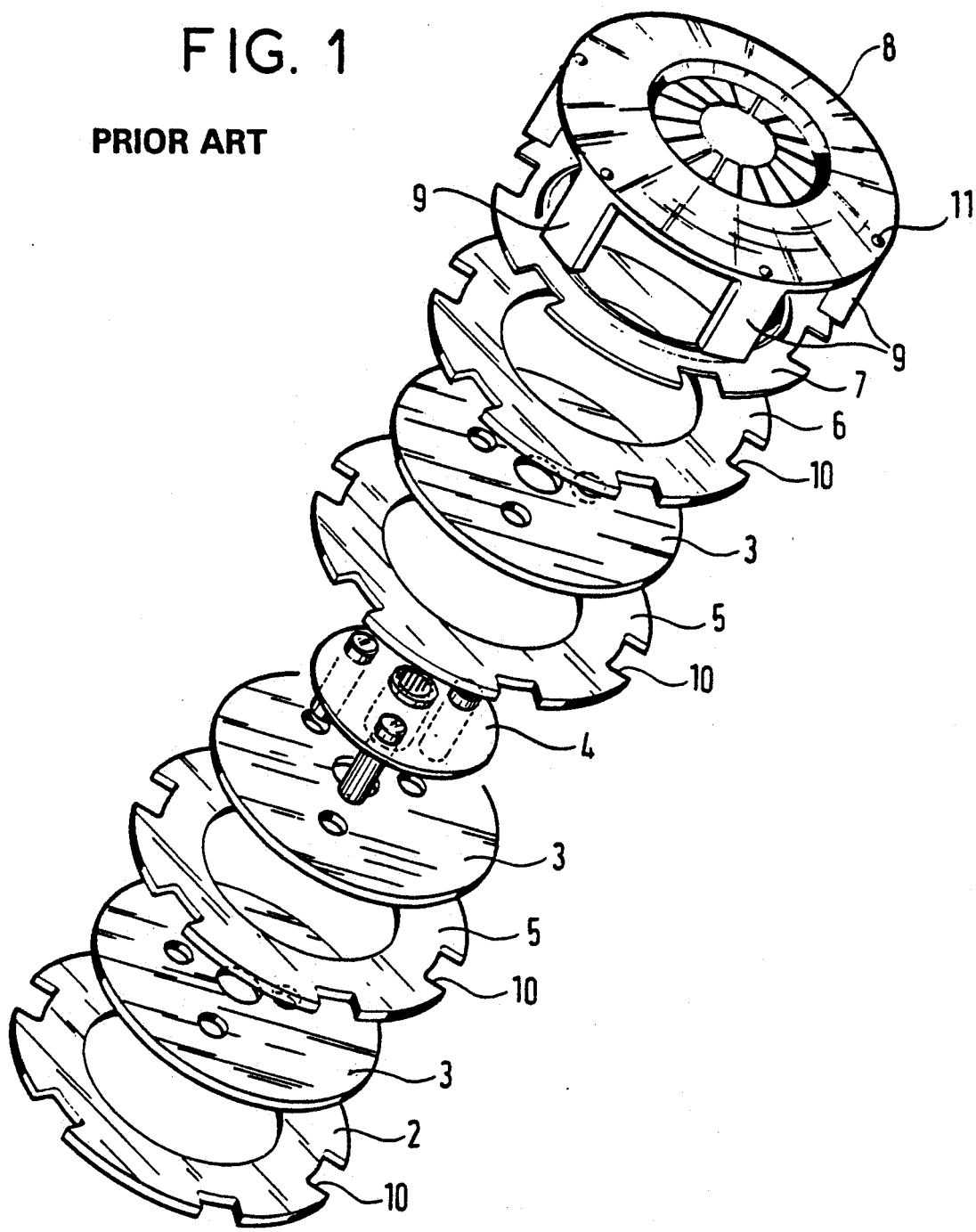
FIG. 1 is a partial exploded view in perspective of a prior art multi-plate clutch with structural plates.

FIG. 1 shows some parts of a known clutch called a "three-plate" clutch (by analogy with conventional clutches with organic linings). On the drive flywheel, which is not shown but which is located in the lower part of the figure, there are fitted a driving plate 2 called the "first" driving plate, three driven plates 3 connected to an output shaft by a hub 4, a driving plate 5 interposed between each pair of driven plates 3, a driving plate 6 called the "second" driving plate, a thrust plate 7, and a casing 8 with a mechanism operable to apply pressure to the thrust plate 7 and provided with bars 9 fitted into radial recesses 10 of the driving plates 2, 5, 6 and fixed to the flywheel by screws fitted in holes 11 in each bar 9 and screwed into the flywheel. The bars 9 may be part of the casing 8 or may be fixed thereto by screws or otherwise.

Figure 2:
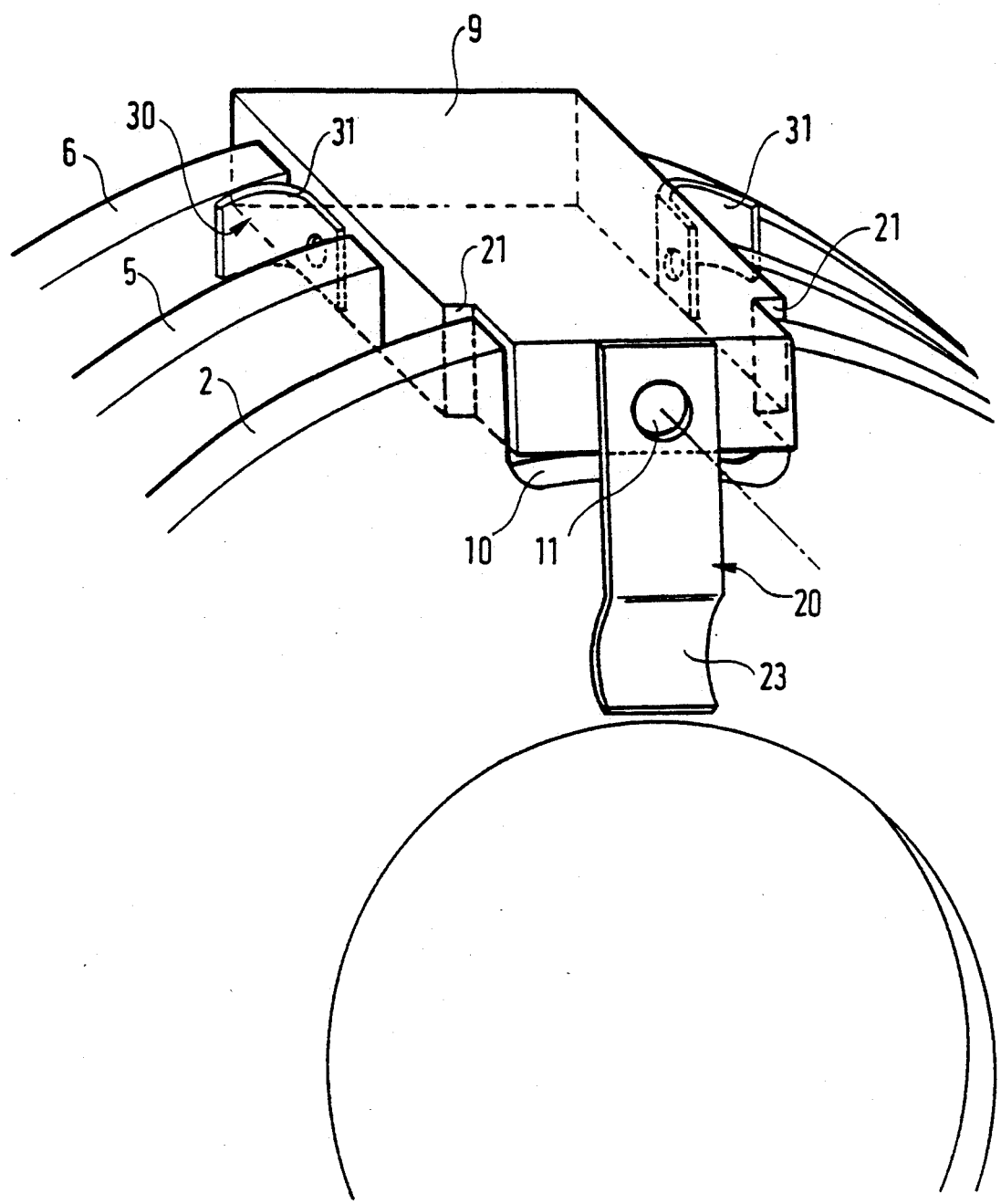
FIG. 2 is a partial perspective view of a first embodiment of a clutch in accordance with the invention.
Figure 3:
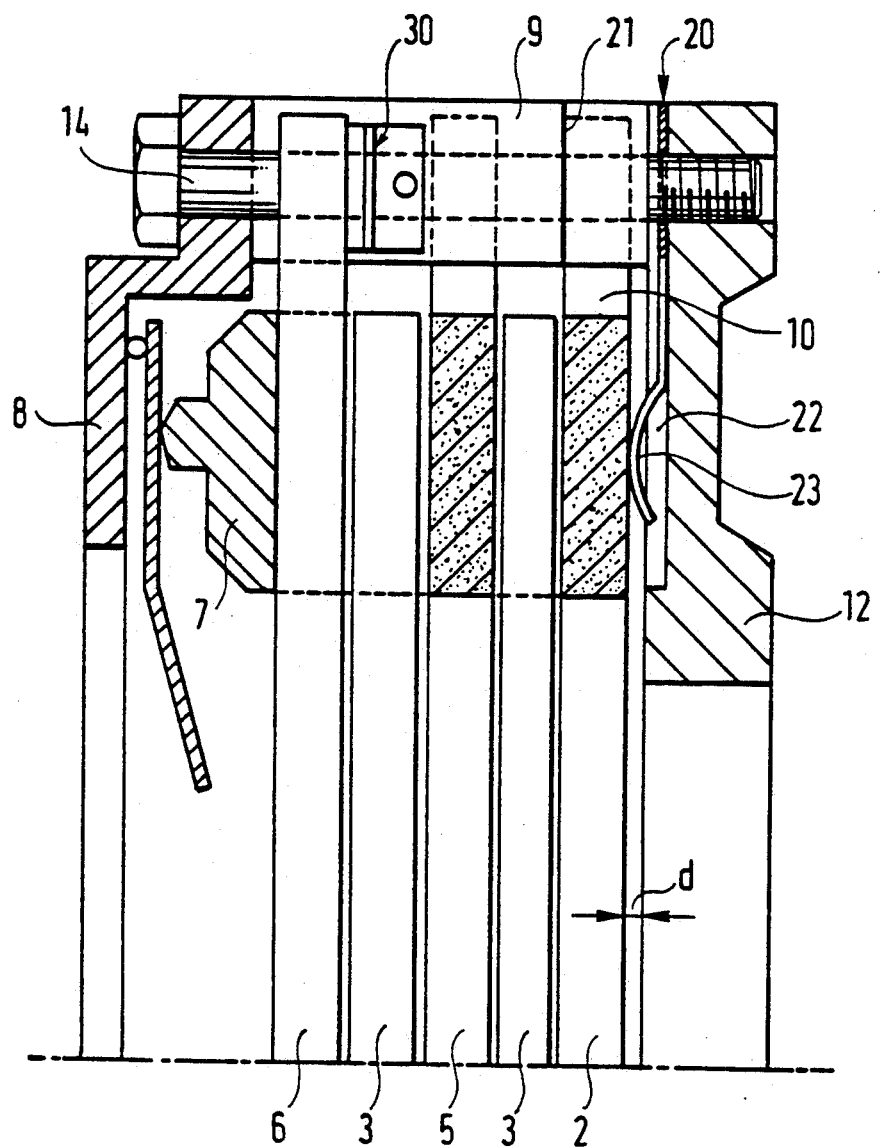
FIGS. 3 and 4 are half sections of such a clutch in the disengaged and engaged positions.
Figure 4:
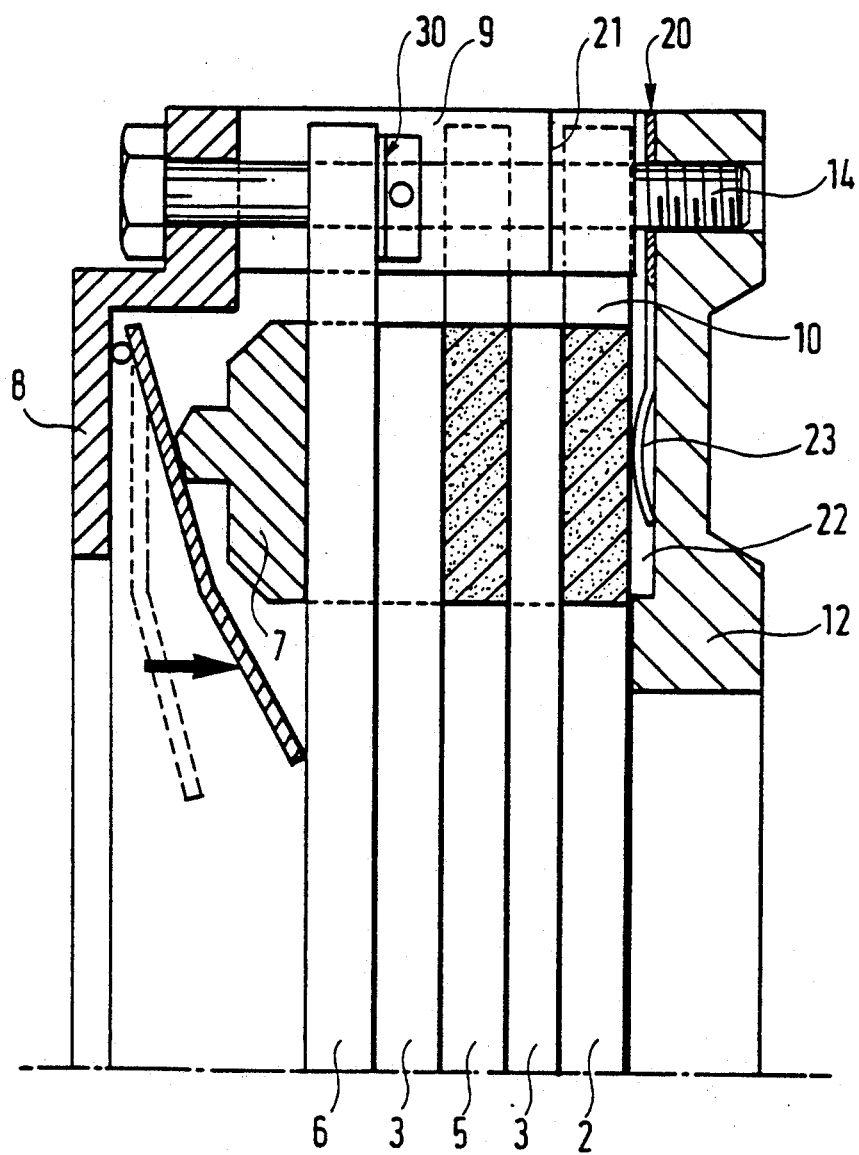

A first variant is shown in FIGS. 2, 3 and 4. In FIG. 2 only the driving plates 2, 5, 6 and one bar 9 are shown for clarity.

A device called a "progressive" device 20 is formed by a resilient metal tongue 23, whose active end is curved and is applied to the first driving plate 2 and whose attachment end is located on the end on the flywheel side of the bar 9 and has a hole receiving the screw 14 connecting the casing 8 to the flywheel 12. At this end the bar 9 is of reduced width, in order to form two abutment shoulders 21, and the recess 10 of the first driving plate 2 is also narrower than the recesses of the other plates 5, 6, in order that the first drawing plate may abut the shoulders 21. A radial groove 22 is associated with this tongue 20, being formed in the inner face of the flywheel 12 and receiving the tongue 20.

A device called a "packing-up" device 30 is formed by two resilient metal tongues 31 located on the two sides of the bar 9. The attachment end of each tongue is riveted to the side face of the bar 9, between the second driving plate 6 and the next adjacent driving plate 5, and its active end is bent through about 90° relative to the attachment end, so as to resiliently press the second thrust plate 6 against the plate 7.

In the disengaged position (FIG. 3), the play is distributed uniformly over the interfaces of the driving plates 2, 5, 6 and the driven plates 3. The play at the flywheel 12 to first plate 2 non-clutching interface, called the "progressive" stroke d is defined by the position of the shoulders 21, when the first plate 2 is pressed against the shoulders by the tongue 20. The play of the thrust plate 7 to second plate 6 non-clutching interface is nil when the latter is pressed against the plate 7 by the tongues 30.

In the engaged position (FIG. 4), the operative end of the tongue 20 is compressed in the groove 22 and retracts to allow the play at all the interfaces to be removed.

By virtue of the device 20, progressive compression of the plates, and hence a non-abrupt engagement, are thus obtained. The progressive stroke is controlled by the position of the abutment means 21.

By virtue of the device 30, the distribution of the play is maximized at the clutching interfaces and better release results on disengagement. Moreover, the compression or engagement occurs in a perfectly uniform manner, without interfering action in the region of the flywheel to first driving plate interface and the thrust plate to second driving plate interface.

Figure 5:
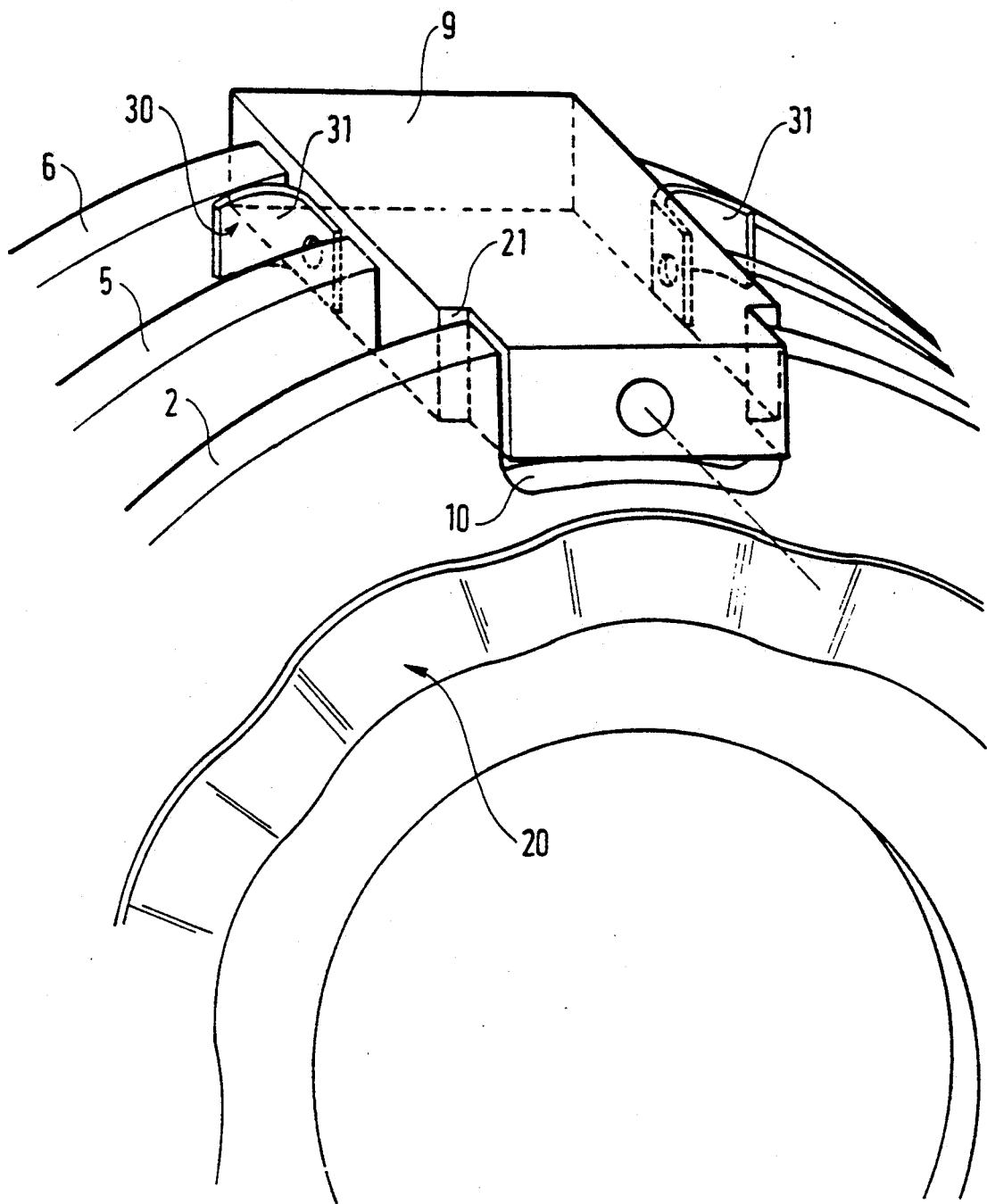
FIG. 5 is a partial perspective view of a second embodiment of a clutch in accordance with the invention.
Figure 6:
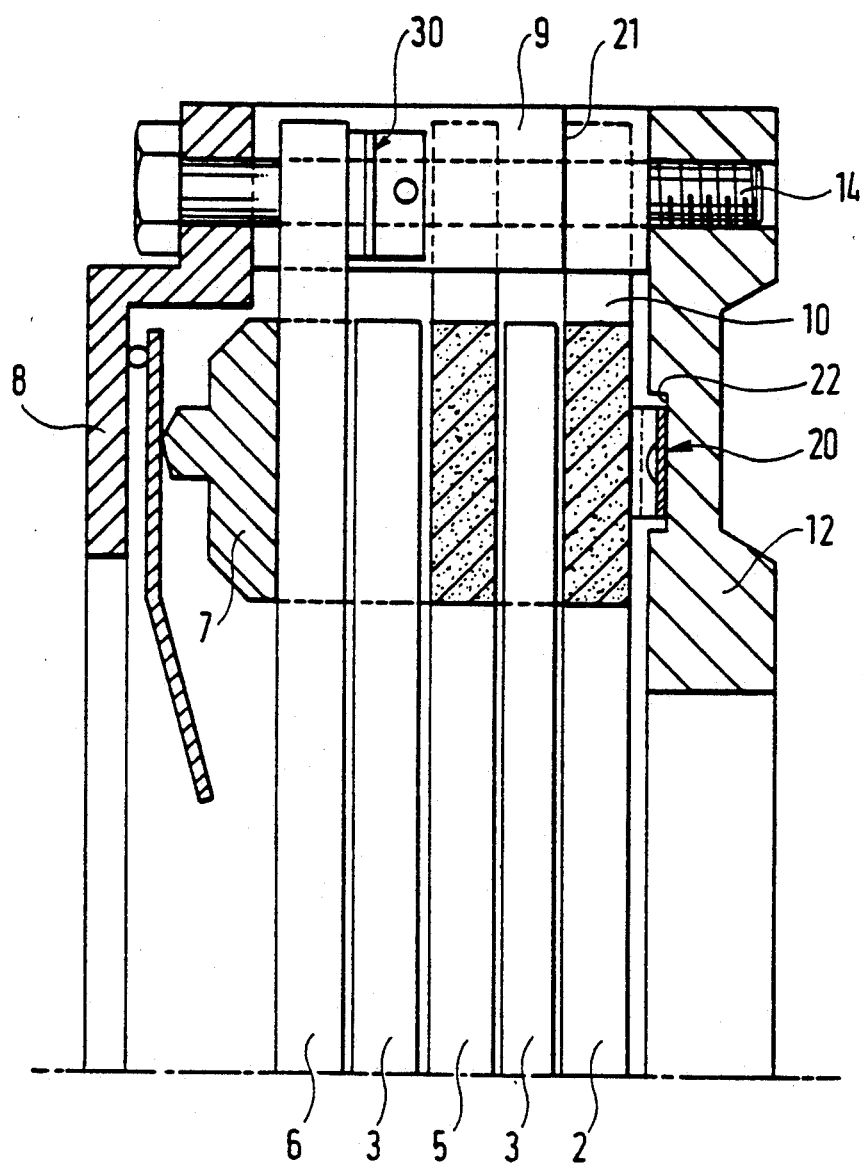
FIG. 6 is half section of such a clutch in the disengaged position.

A second embodiment is shown in FIGS. 5 and 6.

The packing-up device 30 is identical.

The progressive device 20 is a corrugated ring, preferably of metal, fitted in a circular groove 22 recessed into the flywheel 12 and thus located between the latter and the first plate 2. This ring could be retained by riveting to the, as shown, or to the plate or to the flywheel 12.

In the disengaged position (FIG. 6), it ensures there is the progressive stroke d by pressure on the plate 2 and in the engaged position it is retracted into the groove 22.

Figure 7:
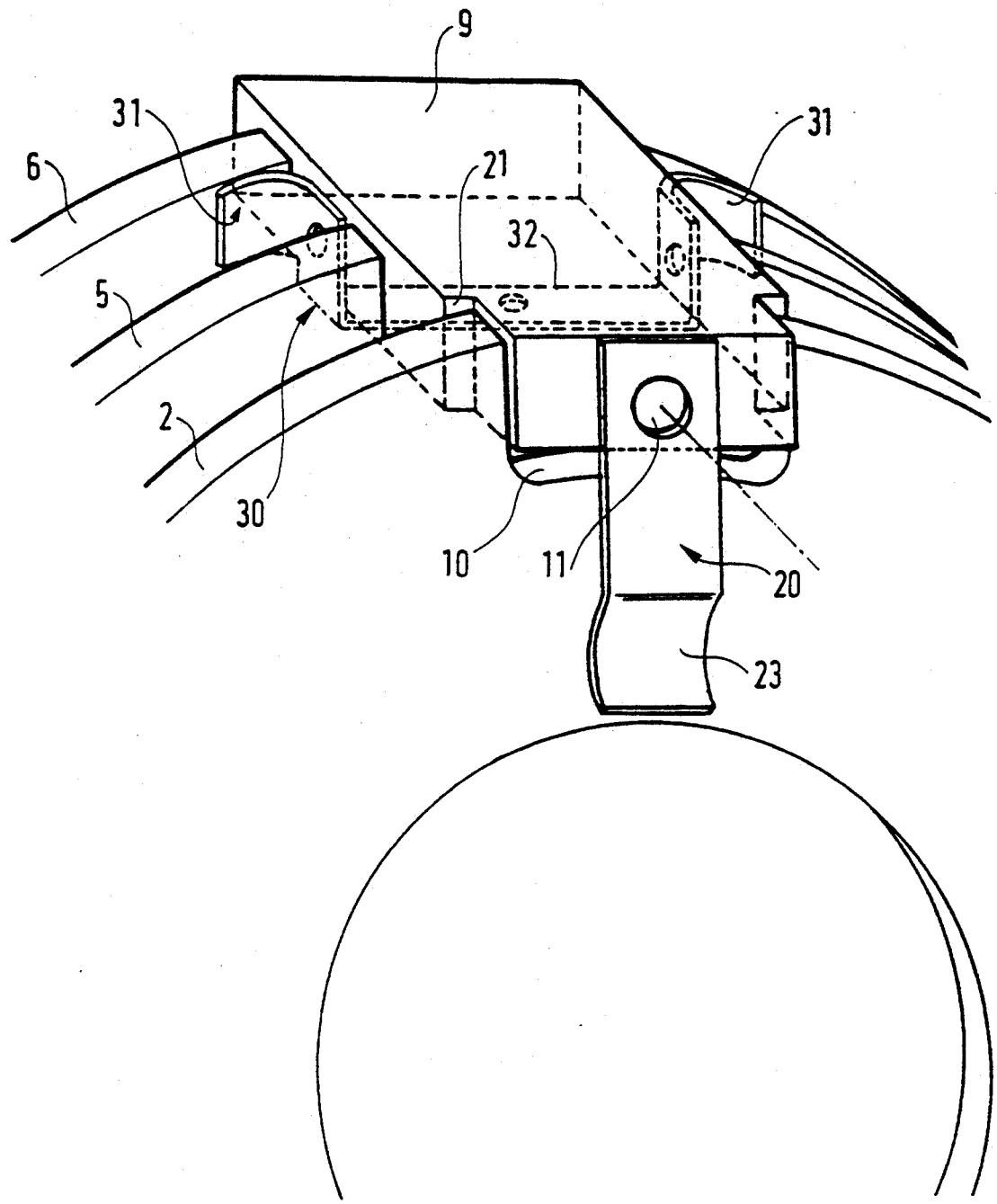
FIG. 7 is a partial perspective view of a third embodiment of a clutch in accordance with the invention.

A third variant is shown in FIG. 7.

The progressive device 20 is identical with that of the first variant.

The packing-up device 30 is here formed by a single bent part, the two resilient tongues 31 being connected by a central strip 32 forming a U with the flat parts of the tongues 31 located against the side faces of the bar 9. The strip 32 is located against the inner face of the bar 9 and is riveted thereto.

The variants illustrated in FIGS. 8 to 11 have progressive devices and packing-up devices in one piece.

Figure 8:
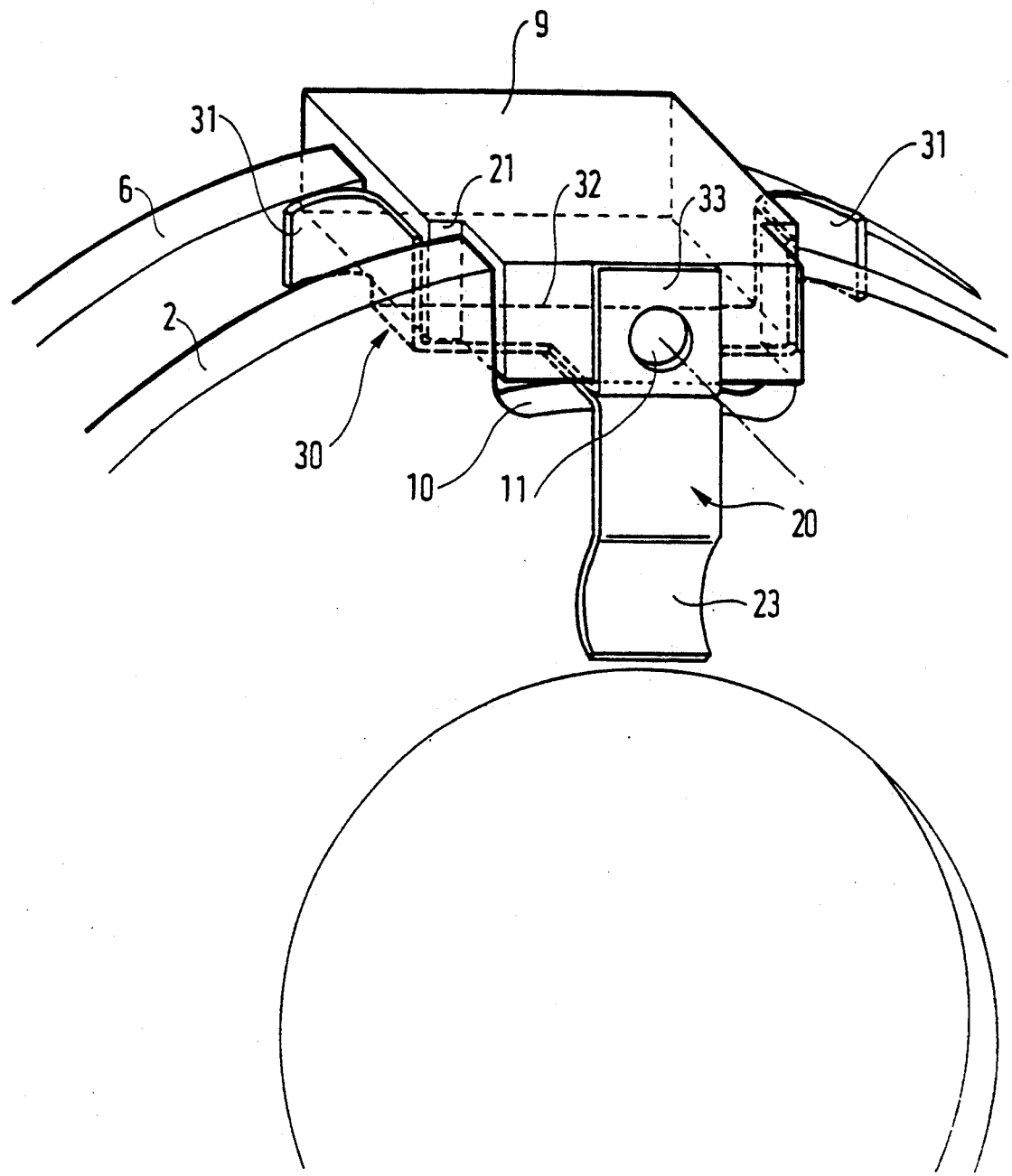
FIG. 8 is a partial perspective view of a fourth embodiment for a clutch in accordance with the invention with a single driven plate.

In FIG. 8 they are of the nature of resilient tongues, 23,31 the progressive device being formed by a radially aligned tongue 23 and the packing-up device including two tongues 31 connected by a central strip 32. This central strip 32 is extended by a perpendicular fixing tongue 33 bent through a right angle so as to be located against the end face of the bar 9, where it is provided with a hole receiving the screw 14 fixing the bar 9 to the flywheel 12. The non-operative end of the tongue 23 is bent through a right angle to lie between the plate 2 and the bar 9, where it is welded to the tongue 33 so as to form a single piece.

Figure 9:
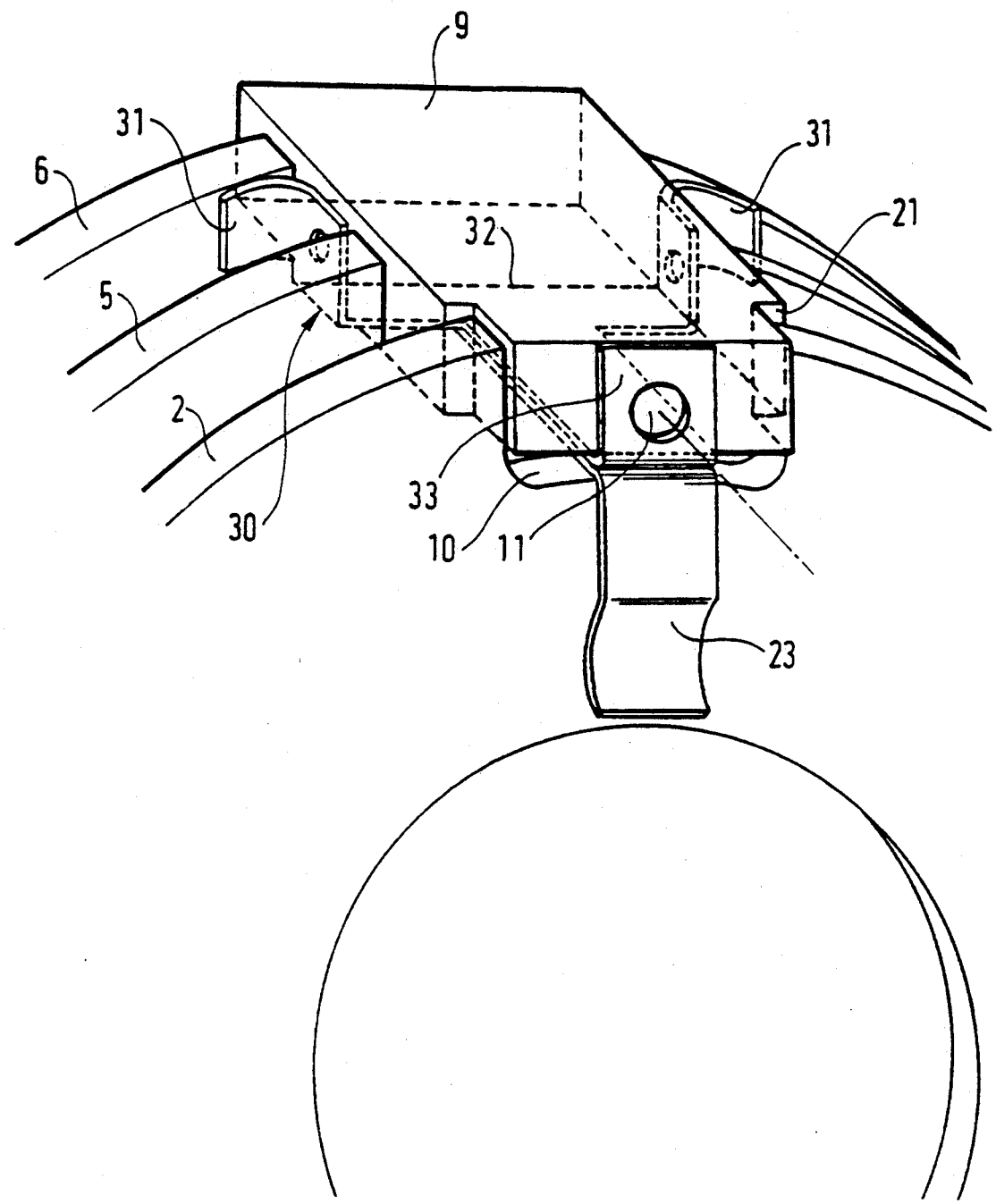
FIG. 9 is a partial perspective of the same embodiment for a clutch in accordance with the invention with two driven plates.

FIG. 8 shows a clutch with a single driven plate, called a "single-plate" clutch. FIG. 9 shows a clutch with two driven plates with the same arrangement of tongues, which is adapted to any multi-plate clutch by selecting the length of the tongue 33.

Figure 10:
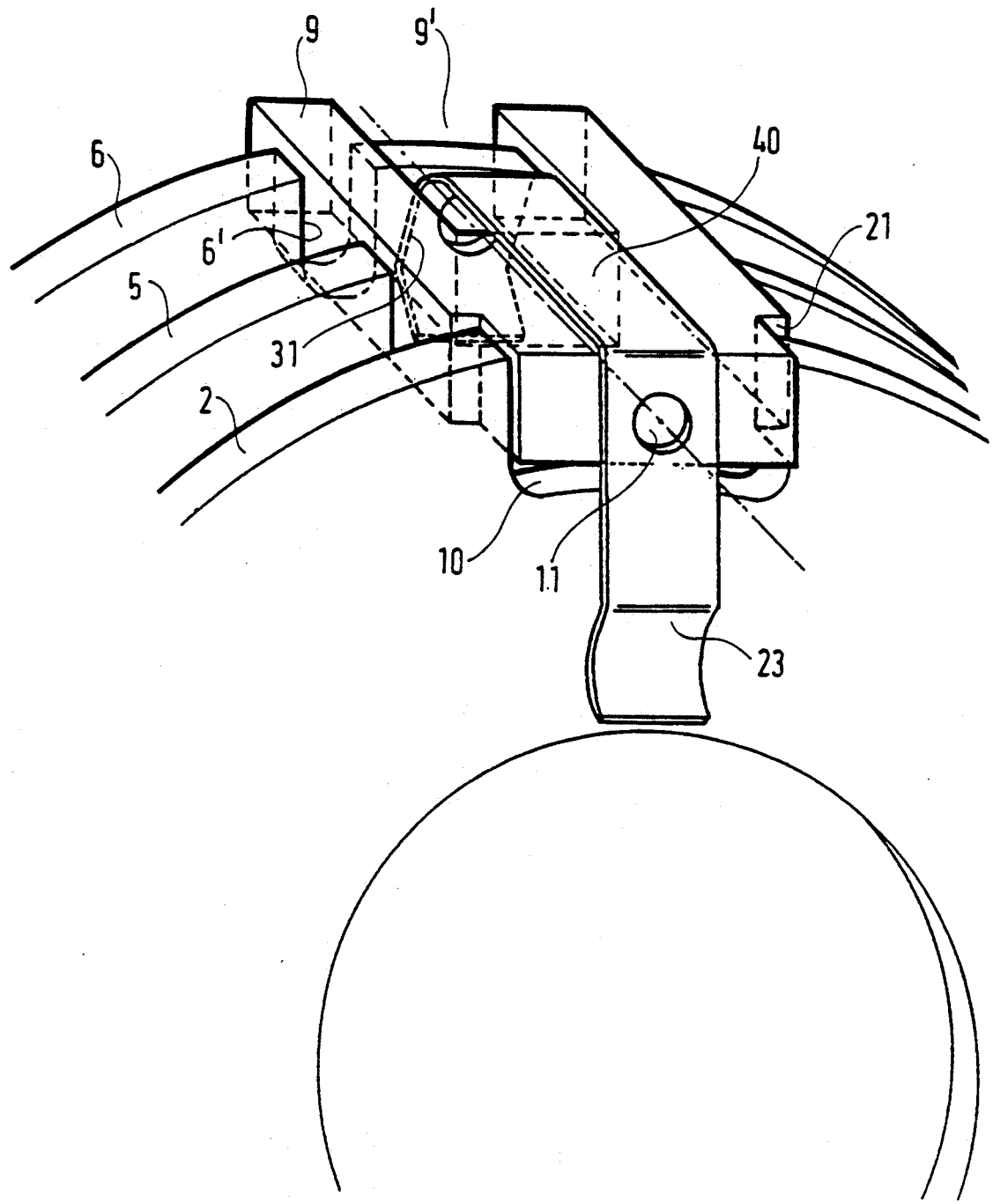
FIG. 10 is a partial perspective view of a fifth embodiment of a clutch in accordance with the invention.
Figure 11:
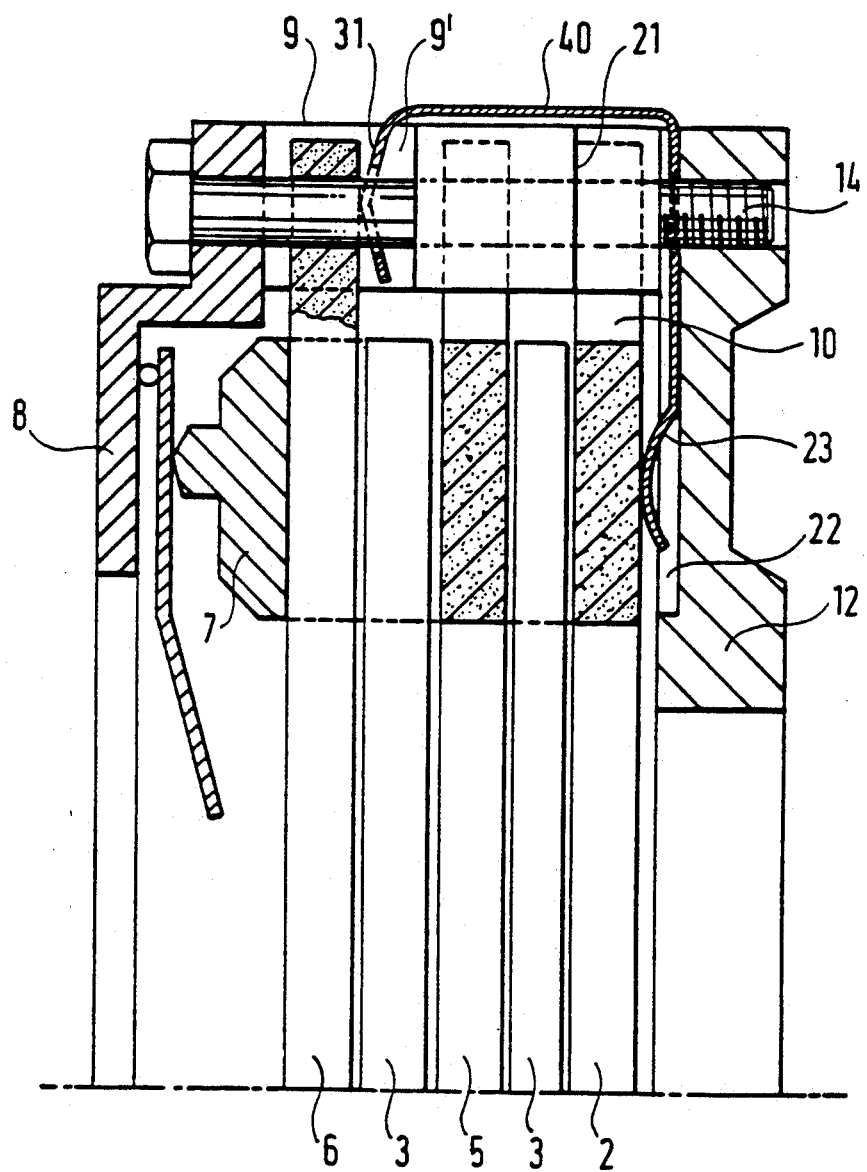
FIG. 11 is a half section of such a clutch in the disengaged position.

The variant shown in FIGS. 10 and 11 requires a special arrangement of the bar 9 and of the second driving plate 6.

The bar 9 has to be a part separate from and fixed to the casing. It is U-shaped an has an opening 9' on the casing side.

The second driving plate 6 has two recesses 6' of smaller size in place of the conventional single recess, to receive the limbs of the U-shaped bar 9. A receiving hole for the screw 14 is provided between the two recesses 6'.

The progressive and packing-up devices are formed by a single bent plate including a first radial progressive part 23 in the form of a resilient tongue like that described above, a second perpendicular part 40 located against the outer face of the bar 9 and a third packing-up part 31 forming a bent resilient tongue pressing the second driving plate 6 by the part of the tongue located between the recesses 6' and provided with a hole for the screw 14 to pass.

Adaptation of this variant to any multi-plate clutch is effected by selecting the length of the tongue part 40.

The devices described above may be fitted to all or not all of the bars 9 of the clutch. The stiffness of the progressive action can thus be controlled by fitting more or less of the progressive tongues. The packing-up tongues should for their/part- be adequate to remove any play between the thrust driving plate and the second plate.

Although the described systems all include a progressive device associated with a packing-up device, these devices have their own functions and only the one or only the other may be fitted to the clutch.

Further, although in the described examples, the progressive device is fitted in the flywheel to first driving plate interface and the packing-up device in the thrust plate to second driving plate interface, this preferred arrangement can be reversed.

Thus the packing-up device 30 shown in FIGS. 2 to 7 may be fitted between the driving plate 6 and the thrust plate 7 and/or between the driving plate 2 and the flywheel 12. (In the latter case the progressive device 20 as shown must be omitted).

It is the same with the progressive device 20 shown in the figures. When the device 20 is fitted on the side of the thrust plate 7, it is the plate 7 which has the associated groove 22. In the case of FIGS. 2, 3, 4 and 7, the bar 9 is separate from the casing 8 and is fixed thereto with the fixing part of the tongue 20 interposed, located against the end of the bar 9 on the casing side.

In the variants shown in FIGS. 8 to 11, the positions of the individual parts can likewise be reversed in like manner. In the case of a reversed arrangement, the bar 9 retains its U-shape but is likewise reversed and it is the first driving plate 2 which has two small recesses.

In the example of FIGS. 10 and 11, the tongue 23 may also be omitted, the device thus only including a packing-up device 30 fixed to the bar 9.

I claim:

1. In a clutch with structural plates of carbon-carbon, comprising:
   a drive flywheel,
   a first driving plate forming with the flywheel a first non-clutching interface,
   at least one pair of driven plates connected to an output shaft, a driving plate being interposed between each pair of driven plates, and forming respective active clutching interfaces therebetween,
   a second driving plate,
   a thrust plate forming with the second driving plate a second non-clutching interface,
   a casing with a mechanism operable to apply pressure to the thrust plate and being provided with a plurality of bars fitted into radial recesses of the driving plates and being fixed to the flywheel,
   the improvement wherein the clutch further includes a device interposed in at least one of the non-clutching interfaces and urging a respective driving plate of said one non-clutching interface towards a respective adjacent driven plate, and against abutment means, and wherein the progressive device is formed by a corrugated ring fitted in a circular groove recessed into a part constituted by one of the flywheel and the thrust plate forming the non-clutching interface with the driving plate.

2. A clutch according to claim 1, wherein the abutment means is formed by at least one shoulder on each bar, against which the edge of the a recess of the driving plate abuts.

3. In a clutch with structural plates of carbon-carbon, comprising:
   a drive flywheel,
   a first driving plate forming with the flywheel a first non-clutching interface,
   at least one pair of driven plates connected to an output shaft, a driving plate being interposed between each pair of driven plates, and forming respective active clutching interfaces therebetween,
   a second driving plate,
   a thrust plate forming with the second driving plate a second non-clutching interface,
   a casing with a mechanism operable to apply pressure to the thrust plate and being provided with a plurality of bars fitted into radial recesses of the driving plates and being fixed to the flywheel,
   the improvement wherein the clutch further includes a progressive device interposed in at least one of the non-clutching interfaces and urging a respective driving plate of said one non-clutching interface towards a respective adjacent driven plate, and against abutment means, and wherein the progressive device is formed by at least one resilient, metal, radial tongue disposed against an end face of each of said bars and having a curved operative end applied to a respective one of the driving plates and being fitted in a respective radial groove recessed into said port constituted by one of said flywheel and said thrust plate and forming the non-clutching interface with said one driving plate.

4. A clutch according to claim 3, wherein said tongue has a tongue part with a hole, disposed between the end of each of said bars and said part constituted by one of said flywheel and said thrust plate forming the non-clutching interface with the driving plate, said hole accommodating means fixing the casing to the flywheel.

5. In a clutch with structural plates of carbon-carbon, comprising:
   a drive flywheel,
   a first driving plate forming with the flywheel a first non-clutching interface,
   at least one pair of driven plates connected to an output shaft, a driving plate being interposed between each pair of driven plates, and forming respective active clutching interfaces therebetween,
   a second driving plate,
   a thrust plate forming with the second driving plate a second non-clutching interface,
   a casing with a mechanism operable to apply pressure to the thrust plate and being provided with a plurality of bars fitted into radial recesses of the driving plates and being fixed to the flywheel,
   the improvement wherein the clutch further includes a progressive device interposed in at least one of the non-clutching interfaces and urging a respective driving plate of said one non-clutching interface towards a respective adjacent driven plate, and against abutment means, further comprising a packing-up device operatively associated with the progressive device, said packing-up device comprising means for pressing a driving plate of the other of said first and second non-clutching interfaces against the adjacent part constituted by one of the flywheel and the thrust plate.

6. A clutch according to claim 5, wherein the packing-up device comprises at least one resilient metal tongue located between the driving plate of a clutching interface and the next adjacent driving plate, and wherein an operative curved end of the resilient metal tongue presses the plate of the other clutching interface against said adjacent part constituted by one of the flywheel and the thrust plate.

7. A clutch according to claim 6, wherein the packing-up device comprises two tongues located on opposite side faces of each of the bars.

8. A clutch according to claim 6, wherein the bars are U-shaped in plan configuration with an opening to one side of the part constituted by one of the flywheel and the thrust plate of the other non-clutching interface, at at least the driving plate proximate to the other non-clutching interface having two recesses receiving limbs of the bar and the resilient tongue being located in the opening and pressing against the driving plate of the other non-clutching interface between the recesses.

9. A clutch according to claim 5, wherein the progressive device and the packing-up device are in one piece.

* * * * *